United States Patent [19]

Burklund et al.

[11] Patent Number: 5,439,601
[45] Date of Patent: Aug. 8, 1995

[54] METHOD OF FILTERING USING A COMMERCIAL FILTERING SYSTEM

[75] Inventors: Sidney A. Burklund, Bothell; Terry D. Olson, Auburn, both of Wash.

[73] Assignee: Filtercorp Partners L.P., Woodinville, Wash.

[21] Appl. No.: 154,923

[22] Filed: Nov. 18, 1993

Related U.S. Application Data

[60] Division of Ser. No. 827,944, Jan. 29, 1992, Pat. No. 5,330,638, which is a continuation-in-part of Ser. No. 695,580, May 3, 1991, Pat. No. 5,143,604, which is a continuation-in-part of Ser. No. 527,566, May 22, 1990, Pat. No. 5,075,000.

[51] Int. Cl.$^6$ ............................................. B01D 41/04
[52] U.S. Cl. .................................... 210/798; 210/799
[58] Field of Search ................. 210/791, 797, 798, 799

[56] References Cited

U.S. PATENT DOCUMENTS

| | | | |
|---|---|---|---|
| 3,279,605 | 10/1966 | Shepherd | 210/110 |
| 3,483,984 | 12/1969 | Wolkenhauer | 210/416.5 |
| 3,849,312 | 11/1974 | Wecker, Sr. | 210/237 |
| 4,043,916 | 8/1977 | Wecker, Sr. | 210/238 |
| 4,112,129 | 9/1978 | Duensing et al. | 426/417 |
| 4,113,623 | 9/1978 | Koether | 210/167 |
| 4,250,039 | 1/1981 | Cozzi et al. | 210/416.5 |
| 4,402,827 | 9/1983 | Joseph | 210/314 |
| 4,444,095 | 4/1984 | Anetsberger et al. | 99/408 |
| 4,517,082 | 5/1985 | Prudhomme | 210/117 |
| 4,591,434 | 5/1986 | Prudhomme | 210/117 |
| 4,604,200 | 8/1986 | Machart, Jr. | 210/314 |
| 4,618,419 | 10/1986 | Hollinshead et al. | 210/416.5 |
| 4,657,673 | 4/1987 | Kessler | 210/108 |
| 4,668,390 | 5/1987 | Hurley et al. | 210/167 |
| 4,702,827 | 10/1987 | Wenzel | 210/117 |
| 4,764,384 | 8/1988 | Gyann | 426/417 |
| 4,804,466 | 2/1989 | Cooper et al. | 210/168 |
| 4,828,694 | 5/1989 | Leason | 210/168 |
| 4,846,967 | 7/1989 | McGehee | 210/416.5 |
| 4,959,144 | 9/1990 | Bernard et al. | 210/232 |
| 4,988,440 | 1/1991 | Bernard et al. | 210/504 |
| 5,062,968 | 11/1991 | Warning | 210/771 |
| 5,075,000 | 12/1991 | Bernard et al. | 210/168 |
| 5,149,449 | 9/1992 | Strid et al. | 210/798 |

FOREIGN PATENT DOCUMENTS

| | | | |
|---|---|---|---|
| 660559 | 5/1987 | Czech Rep. | 210/167 |
| 0241617 | 10/1987 | European Pat. Off. | |
| 1432748 | 3/1969 | Germany | |

OTHER PUBLICATIONS

*Evaluation of Frying Oil Filtration System*, "Journal of Food Science", 57(3):651-654 (1992).

Primary Examiner—Robert A. Dawson
Assistant Examiner—W. L. Walker
Attorney, Agent, or Firm—Christensen, O'Connor, Johnson & Kindness

[57] ABSTRACT

A filtering system used to filter contaminated fluid. The filtering system (10) includes a supply pump (12); a filter tank (14) having a plurality of removable filter cassettes (16) disposed therein, each filter cassette housing in proper orientation a filter pad (164); a suction pump (18); a level control mechanism (148) maintaining a substantially uniform level of contaminated fluid within the filter tank; and a control panel (20) housing other process control components. Operation of the filtering system includes a backflush cycle and a relaxation cycle to extend the loading life of the filter pads. Also included is a preventive measure designed to eliminate fluid shear that may result as the filter pads approach the end of their loading life.

18 Claims, 11 Drawing Sheets

METHOD OF FILTERING USING A COMMERCIAL FILTERING SYSTEM

RELATED APPLICATIONS

This application is a divisional of the prior application Ser. No. 07/827,944, filed on Jan. 29, 1992, which is now U.S. Pat. No. 5,440,638, and which is a continuation-in-part of prior application Ser. No. 07/695,580, filed May 3, 1991, which is now U.S. Pat. No. 5,143,604, having the benefit of the filing dates of which are hereby claimed under 35 U.S.C.§120. Prior application Ser. No. 695,580 is a continuation-in-part of prior application Ser. No. 527,566 filed May 22, 1990, which issued as U.S. Pat. No. 5,075,000 on Dec. 24, 1991.

TECHNICAL FIELD

This invention relates to commercial filtering systems and, more specifically, to filtering systems particularly useful in filtering hot cooking oil utilized in commercial settings.

BACKGROUND OF THE INVENTION

Cooking oils, such as those used in commercial deep fryers, tend to become contaminated with such things as moisture, food cell bodies, and food plasmas during frying. The oils also tend to break down chemically after extended use, often causing the oil to foam, smoke, smell bad, look bad, or taste bad. It has been found that keeping the cooking oil clean by filtering it on a regular basis tends to extend the useful life of the cooking oil, and increases the quality and appearance of foods which are cooked therein.

A variety of specialized systems and filter media for filtering cooking oil have been developed. Ideally, such filtering systems would remove contaminants from the cooking oil down to a level of about one micron. However, in large-scale industrial applications, such as commercial deep fryers used to cook potato chips or precook french fries, this desired level of ultrafiltration has not been feasible. Current filtering systems being used in this area of application may be broadly segregated into two types—absolute filtering systems and depth filtration systems.

Absolute filtering systems employ a filter medium such as paper or a metal screen (wire cloth), the medium having a discrete pore size. Contaminated cooking oil may be moved through the filter medium by gravity, positive pressure, or vacuum. However, gravity feed is by far the most common due to economic considerations.

While ultrafiltration levels approaching one micron are possible with absolute filtering systems, multiple stages of filter media having incrementally smaller pore sizes must be employed. Such an approach yields an arduous and costly filtering system. Furthermore, such absolute filtering systems possess a poor loading capacity, thereby requiring frequent changeouts of the filter medium. Of course, such changeouts have the detrimental effect of a complete stop in production. Additionally, if a metal screen medium is utilized, cleaning such a screen can be a difficult and time consuming process. The result of these limitations is that, if ultrafiltration approaching one micron is desired, large volumes of contaminated oil simply cannot be economically handled.

Depth filtration systems utilize a filter medium having a substantial depth dimension, which thereby allows contaminants to be removed throughout the entire depth of the medium. This yields an increased loading capacity relative to absolute filtration. Contaminated cooking oil may be moved through the filter medium by positive pressure, as is found, for instance, in plate-and-frame filtering systems. Contaminated cooking oil may also be moved through the filter medium under a vacuum, as is found in rotary vacuum filtering systems. Both systems typically employ the use of a filtering powder (e.g., diatomaceous earth) that is added to the contaminated oil. The filtering powder, which is suspended in the contaminated oil, begins to plate out over the septum (e.g., the porous drum in the rotary vacuum system) during the initial stages of filtering. When a sufficient layer of filtering powder has so formed, a depth filter medium is created over the top of the septum. Gravity feed is not feasible with depth filtration systems, as a force greater than that of gravity is required to move the contaminated cooking oil through the filter medium.

Depth filtration systems utilized in large-scale industrial applications require very large and sophisticated filtering equipment, as well as a good deal of support equipment. Such systems are therefore very expensive. Additionally, while such depth filtration systems can handle large volumes of contaminated oil, they cannot economically achieve filtration levels below approximately 10 microns. These systems also require periodic removal of the filter medium, which leads directly to process down time. In fact, due to the complex nature of the equipment involved, down time may be even longer with such systems than is the case with absolute filtering systems. Additionally, the cleanup process may be complex and time consuming for depth filtration systems and, in the case of positive pressure systems, may be hazardous.

As a result, there has been a long-felt need for a filtering system and medium combination useful in filtering contaminated cooking oil that: (1) can handle the large volumes of contaminated cooking oil required in large-scale industrial applications; (2) achieves ultrafiltration levels near or below one micron; (3) exploits those attributes incident to depth filtration; (4) is relatively inexpensive to produce; (5) is self-contained, thereby requiring virtually no support equipment; (6) causes no excessive damage to the oil during filtering; and (7) ensures proper orientation of the filter medium during the filtering process. A similar need exists in the large-scale commercial filtering of other contaminated fluids (e.g., motor oil, etc.). The present invention, when used in conjunction with a currently available filter medium, is directed to satisfying the above-described need.

SUMMARY OF THE INVENTION

In accordance with the present invention, a filtering system used to filter contaminated fluid (such as cooking oil) is disclosed. Associated methods of operation are also disclosed. The filtering system includes a supply pump, a filter tank having a plurality of removable filter cassettes disposed therein, a suction pump, a level control mechanism maintaining a substantially uniform level of fluid within the filter tank, and a control panel housing other process control components. The supply pump draws contaminated fluid from a supply source and feeds it into the filter tank. The suction pump provides the vacuum necessary to draw contaminated fluid through the filter cassettes, and further provides the positive displacement required to return the filtered cooking oil to the supply source.

Filtering takes place within the plurality of filter cassettes. Each filter cassette is configured to house a filter pad in a substantially fluid-tight sealed manner to prevent contaminated fluid from exiting the filter cassette without passing through the filter pad. The filter cassette is further configured to allow only the exit side of the filter pad to rest against an associated seating surface, thereby ensuring proper filter pad orientation.

The disclosed methods of operation include a backflush cycle, a relaxation cycle, and a shear prevention measure. The periodically administered backflush cycle is designed to dislodge contaminants that have built up on the entrance side of the filter pad. During the backflush cycle, forward flow is stopped and the suction pump is started in reverse for one or more short pulses of reverse fluid flow. The periodically administered relaxation cycle is designed to dislodge contaminants accumulated within the interior region of the filter pad. To effect the relaxation cycle, normal forward flow is interrupted for a pause period and then reapplied for a resumption period. This pause period of no flow followed by a resumption period of normal forward flow may be repeated until sufficient internal dislodging of accumulated contaminants has occurred. Use of the backflush cycle and relaxation cycle, whether alone or in combination, significantly adds to the loading life of the filter pad.

Despite the rejuvenation of the filter pad accomplished by the backflush and relaxation cycles, the filter pad eventually reaches a fully loaded state beyond which it cannot be effectively used. As this state is approached, increased resistance to flow through the filter pad results in the frequency of the suction pump outpacing its flow rate, thereby leading to detrimental churning, or shearing, of the filtered fluid. At this point, the shear prevention measure reduces the operating frequency of the suction pump to eliminate any fluid shear.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION OF THE PREFERRED EMBODIMENT

Figure 1:
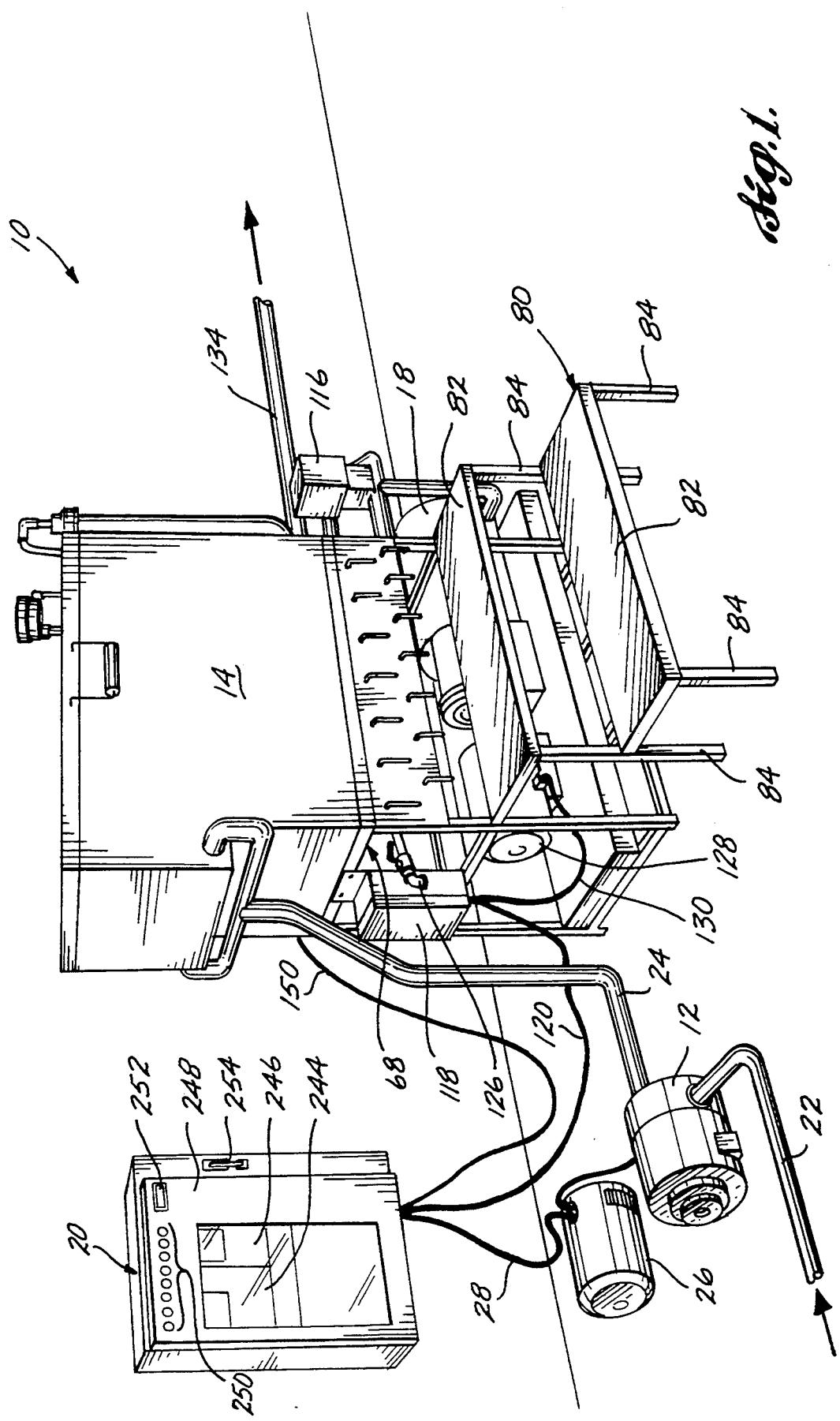
FIG. 1 is an environmental perspective view of a filtering system made in accordance with the principles of the present invention.
Figure 2:
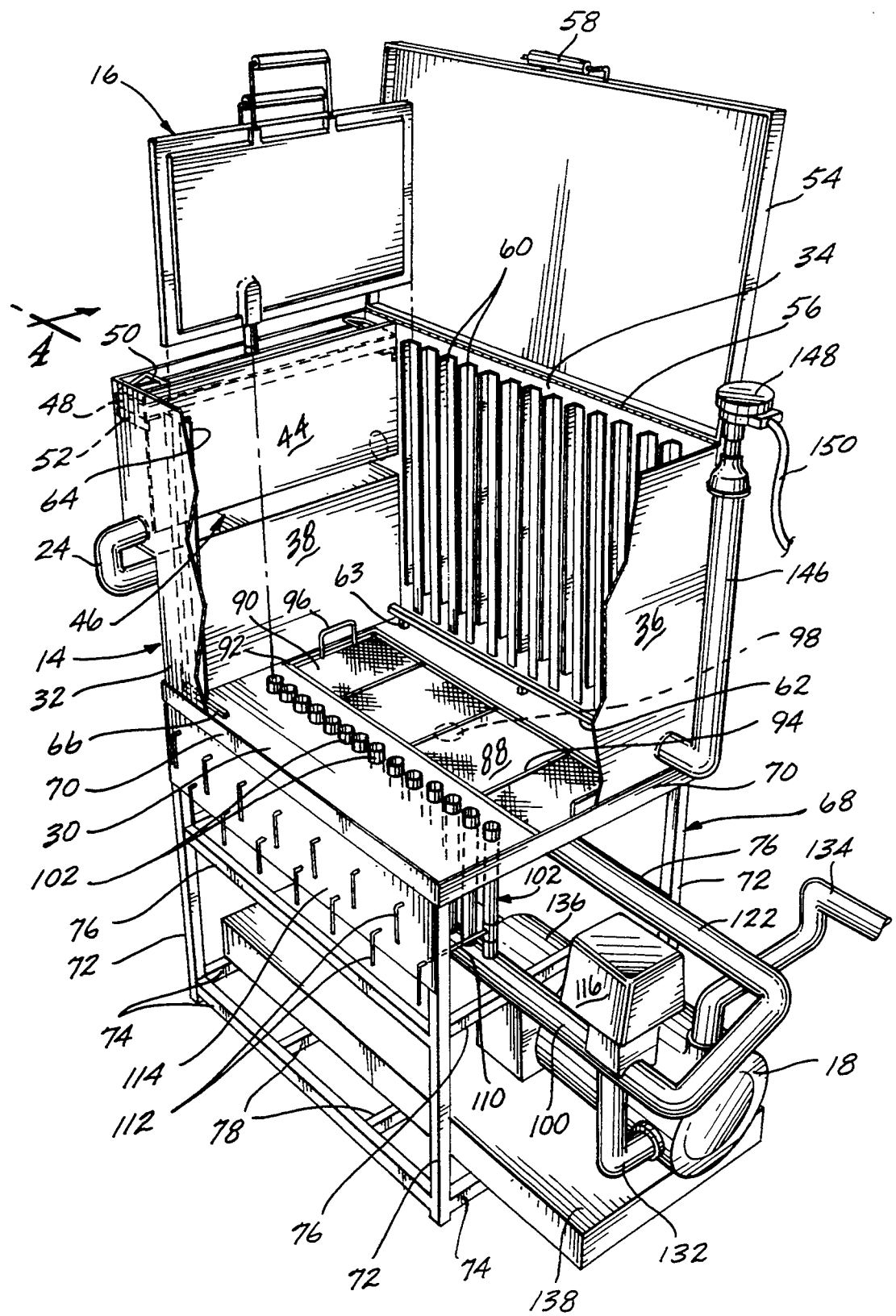
FIG. 2 is a perspective view of the filter tank and surrounding components of the filtering system shown in FIG. 1, said view showing the cover to the filter tank in an open position, a filter cassette exploded from its position of application, and cuts taken through the walls of the tank to better illustrate internally disposed components.

As illustrated in FIGS. 1 and 2, a filtering system 10 formed in accordance with the present invention may be utilized to filter contaminated cooking oil drawn from a large-scale conventional supply source (not shown). A typical example of such a supply source would be a fryer used to cook bulk amounts of potato chips.

The filtering system 10 generally includes a supply pump 12, a filter tank 14 having a plurality of filter cassettes 16 disposable therein, a suction pump 18, and a control panel 20. In short, the supply pump 12 draws contaminated cooking oil from the supply source and feeds it to filter tank 14, wherein the filtering process takes place within the plurality of filter cassettes 16. Suction pump 18 provides the vacuum necessary to draw the contaminated cooking oil through the filter cassettes 16, and provides the positive displacement required to return the filtered cooking oil to the supply source. Monitoring and control of the filtering system 10 is primarily accomplished by components housed within control panel 20.

Referring to FIG. 1, it is illustrated that supply pump 12 is connected at its inlet side to a supply line 22 carrying contaminated cooking oil from the supply source. The discharge side of supply pump 12 is connected to a feed line 24, which introduces the contaminated cooking oil into filter tank 14. A three-phase motor 26, coupled to control panel 20 through a lead 28, drives the supply pump. Supply pump 12 may be of any conventional design (e.g., positive displacement, propeller, centrifugal, etc.), provided that it is of variable speed and capable of being powered by a three-phase motor. In most environments of application, the head that must be provided by supply pump 12 to introduce contaminated cooking oil into filter tank 14 is relatively small. Thus, a positive displacement pump—which is more expensive—is usually not required.

Figure 3:
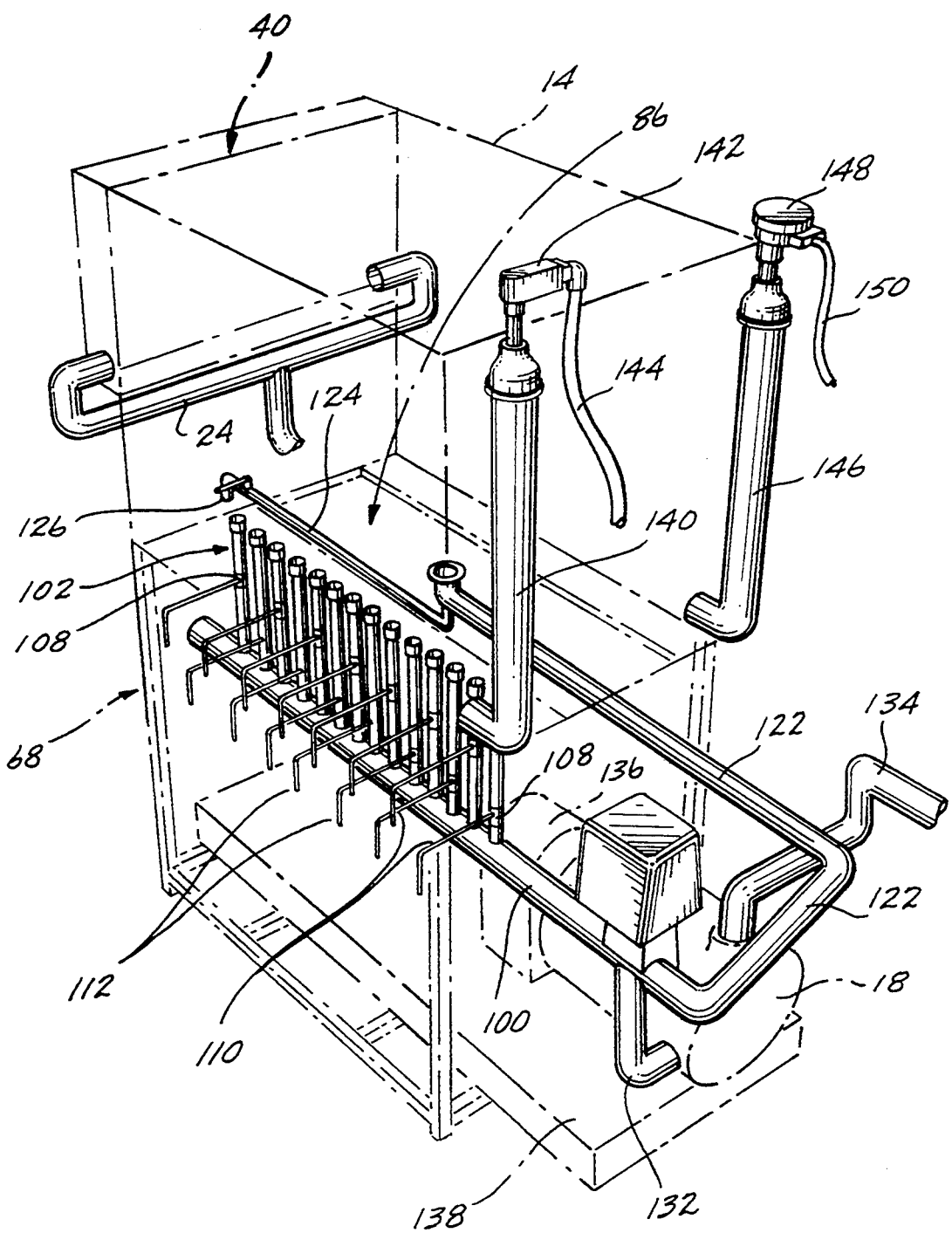
FIG. 3 is a perspective view similar to FIG. 2, said view showing the principal conduits associated with the travel of fluid into and out of the filter tank in solid line and showing the filter tank and most surrounding components in phantom line.
Figure 4:
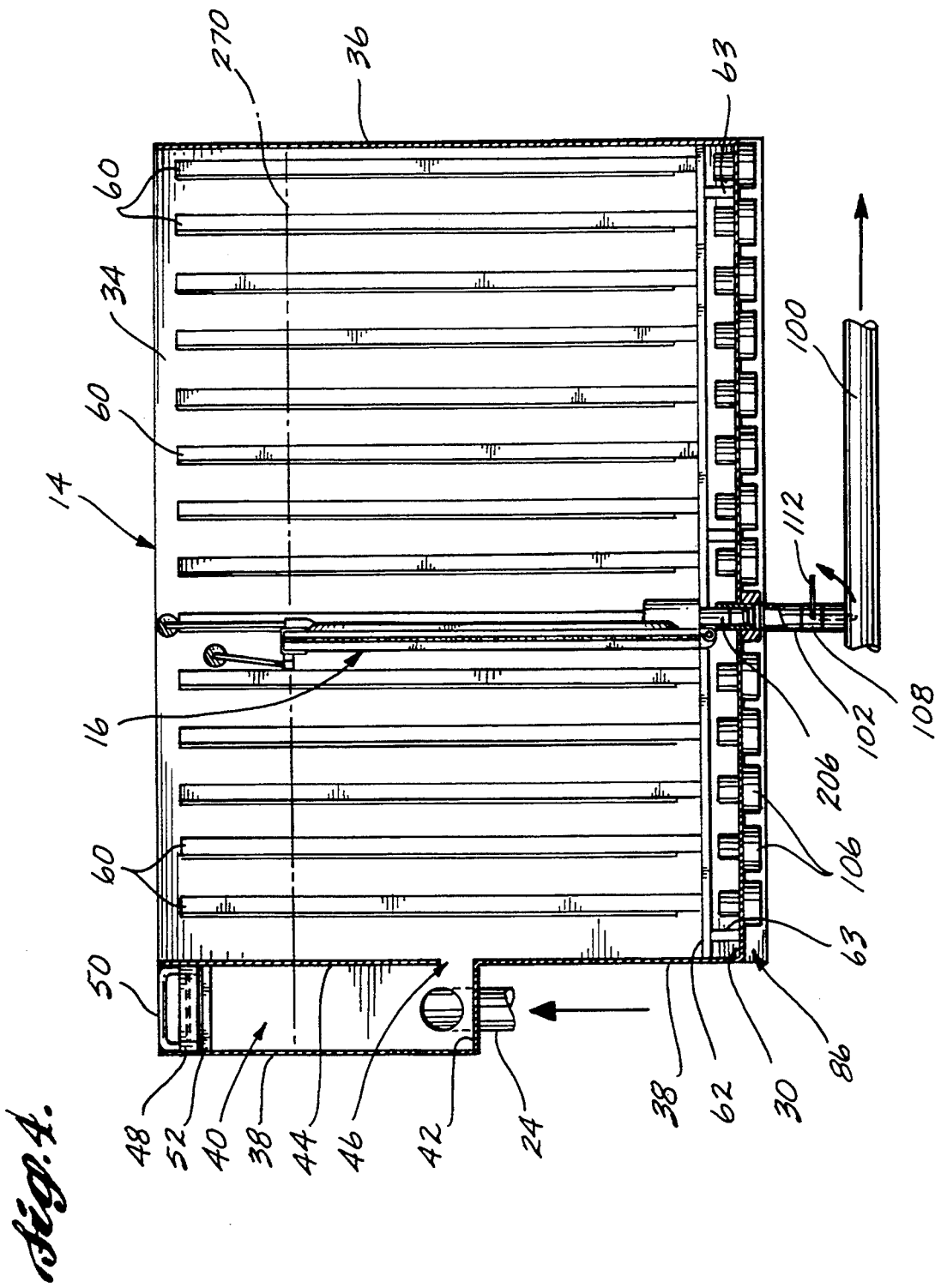
FIG. 4 is a partial cross-sectional side view of the filter tank, showing a filter cassette in place, taken along line 4—4 of FIG. 2.

Referring to FIGS. 2, 3, and 4, it is illustrated that filter tank 14 is of rectangular cross section and has its volume defined by a bottom surface 30, a front sidewall 32, a back sidewall 34, a right end wall 36, and a left end wall 38—the bottom surface being horizontally oriented and the sidewalls and end walls being vertically oriented (see FIG. 2).

The upper portion of left end wall 38 is outwardly disposed from its lower portion to define an intake compartment 40. Intake compartment 40 is also of rectangular cross section and has a horizontally oriented bottom surface 42, disposed at the approximate height-wise midpoint of filter tank 14, that joins the upper and lower portions of left end wall 38 (see FIG. 4). A vertically oriented divider 44, which is coplanar with the lower portion of left end wall 38, extends downwardly from the top of filter tank 14 to a position proximate to, but spaced from, bottom surface 42 to define the inner boundary of the intake compartment 40 and thereby divide the intake compartment from the central volume of filter tank 14. Thus, a supply gap 46 is formed between the lower terminus of divider 44 and the innermost edge of the bottom surface 42 of intake compartment 40, said supply gap introducing contaminated cooking oil to the central volume of filter tank 14.

An opening is formed in both the front and back walls of intake compartment 40 at positions just above bottom surface 42, the openings being sized to receive the feed line 24 connected to the discharge side of supply pump 12 (refer additionally to FIG. 1). Feed line 24 is branched at a location just outside intake compartment 40 in order to provide two separate input streams into the intake compartment. This split-stream design decreases the input velocity of the contaminated cooking oil, thereby diminishing splashing concerns and reducing undesirable aeration of the contaminated cooking oil. As is well known, aeration has a detrimental degradation effect on the oil.

To further diminish splashing concerns, a splash screen 48, consisting of a wire mesh screen secured at its perimeter to a rectangular support frame, is disposed within the upper regions of intake compartment 40. Splash screen 48 has a handle 50 disposed on each end, and it is supported at each end within the upper regions of intake compartment 40 by a pair of supports 52. Supports 52 are of double-flange design, one flange supporting the splash screen 48 and one flange being attached to the front or back wall of intake compartment 40 by conventional methods (e.g., welded, bolted, etc.).

A cover 54, hingedly coupled to the upper portion of back sidewall 34 through a piano hinge 56, has a rectangular perimeter sized to enclose filter tank 14 (see FIG. 2). A centrally located handle 58 is mounted near the front edge of cover 54 by conventional methods. Stops (not shown) are disposed on the outside surface of back sidewall 34 at a location adjacent piano hinge 56 to restrict full rotation of cover 54, thereby providing a convenient and secure open position for the cover.

On the inside surface of back sidewall 34 are mounted fourteen vertically oriented and equally spaced guides 60, the guides being of double-flange configuration. Each guide 60 has a first flange secured to back sidewall 34 by conventional methods. The second flange of each guide 60 extends orthogonally inward from back sidewall 34 toward the central region of filter tank 14. The first flange of each guide 60 terminates at its lower end at a location immediately above and adjacent a support bar 62 of rectangular cross section. Support bar 62, which is supported above the bottom surface 30 of filter tank 14 by three evenly spaced posts 63, extends in length from right end wall 36 to left end wall 38 to bear the weight of filter cassettes 16. The second flange of each guide 60 terminates at its lower end at a location well above support bar 62.

On the inside surface of front sidewall 32 are mounted fourteen vertically oriented and equally spaced guides 64 (see FIG. 2). Guides 64 are of the same double-flange design as guides 60, and are mounted to front sidewall 32 in the same manner that guides 60 are mounted to back sidewall 34. Similarly, the lower end of the mounting flange of each guide 64 terminates at a location immediately above and adjacent a support bar 66, the support bar extending in length from right end wall 36 to left end wall 38. Support bar 66 is also supported above the bottom surface of the filter tank by three evenly spaced posts (not shown). The lower end of the inwardly extending flange of each guide 64 terminates at a location well above support bar 66.

The inwardly extending flanges of guides 60 are aligned with those of guides 64 and are spaced such that guide channels are formed, the guide channels providing a path of insertion and extraction for the filter cassettes 16. In order to provide the maximum number of filter cassettes 16 per unit volume of the filter tank 14, the distance between adjacent guides along both back sidewall 34 and front sidewall 32 is just great enough to allow insertion and extraction of the filter cassettes. While this guide configuration theoretically may prevent side-to-side movement of the filter cassettes 16, no such movement actually occurs once the filter cassettes are properly inserted and seated within the filter tank.

A frame 68 supports filter tank 14 in an elevated position. Frame 68 includes a horizontally oriented rectangular tank support 70 having a support leg 72 extending downwardly from each of its four corners (see FIG. 2). Tank support 70 is of double-flange configuration, the first flange extending upwardly and having a perimeter sized to receive filter tank 14 and the second flange extending horizontally inward to provide a supporting edge upon which the filter tank rests. To provide increased stability to frame 68, a horizontal cross member 74 extends between each support leg 72 near the end of the support leg distal from tank support 70. A horizontal cross member 76 extends between each support leg 72 at a position slightly above the vertical midpoint of the support leg. Additionally, two cross members 78 extend between front and back cross members 74 in an orientation parallel to end cross members 74.

To allow operator access to the interior of filter tank 14, access steps 80 are provided at the front of the filter tank (refer additionally to FIG. 1). Access steps 80 include two horizontally oriented platforms 82 supported at an elevated position by downwardly extending support legs 84. The upper platform 82 is attached by conventional methods to the front cross member 76 of frame 68.

A rectangular lower recessed area, or sump 86, is formed in the bottom surface 30 of filter tank 14 at a location more proximate back sidewall 34 than front sidewall 32 of the filter tank (see FIGS. 2 and 3). Sump 86 extends in length from left end wall 38 to right end wall 36. A sump screen 88, having a wire cloth 90 attached to an outer rectangular frame 92, is disposed within sump 86. Wire cloth 90 is attached to frame 92 in a manner such that the wire cloth is supported at a position slightly above the flat bottom surface of sump 86 when the sump screen 88 is in place. Three support bars 94 extend between the longer sides of frame 92 to provide structural rigidity to sump screen 88. Upwardly extending handles 96 are disposed at the shorter sides of frame 92 to provide for easy insertion and removal of the sump screen. A centrally located drain aperture 98 is formed in the bottom surface of sump 86.

A hollow cylindrical manifold 100 is horizontally disposed beneath the bottom surface 30 of filter tank 14 at a position parallel to and between sump 86 and front sidewall 32 of the filter tank (see FIGS. 3 and 4). Fourteen hollow cylindrical risers 102 extend upwardly from manifold 100 through bottom surface 30 of filter tank 14 to terminate at a location slightly above the bottom surface. The inside surface of the upper terminal end of each riser 102 acts as the female portion of a slip coupling by being configured to receive the male portion of filter cassette 16 in a manner described below. A sealer mount 106, which extends snuggly around the outer periphery of each riser 102, is disposed immediately below the bottom surface 30 of filter tank 14. Sealer mount 106 serves to maintain the upper terminal end of each riser 102 in a secure position, and further serves to prevent leakage of contaminated cooking oil from the filter tank at the location where the riser passes through bottom surface 30.

A control valve 108 is disposed within each riser 102 at a location along the central portion of each riser. Each control valve 108 is manually operated through an actuator 110 which extends orthogonally outward from the control valve to a position beyond the plane defined by the front sidewall 32 of filter tank 14. At this position, the actuator 110 bends approximately ninety degrees to terminate in a short handle portion 112. Prior to making this ninety-degree bend, each actuator 110 passes through an opening formed in an actuator plate 114, the actuator plate being mounted at its ends to the two front support legs 72 of frame 68 at a position immediately adjacent and below tank support 70 (see FIG. 2). The control valves 108 and actuators 110 of successive risers 102 are vertically staggered so that the handle portions 112 of successive risers do not interfere with one another during operation. When the handle portion 112 of each actuator points in a downward direction, control valve 108 is in an open position. When the handle portion 112 is rotated approximately ninety degrees in a counterclockwise direction, the control valve 108 is in a closed position, thereby preventing passage of cooking oil from filter tank 14 to manifold 100. Using a separate control valve and actuator for each riser allows all of the inserted cassettes, or only a fraction thereof, to be utilized during filtering operations.

The end of manifold 100 proximate left end wall 38 is closed. The opposite end of manifold 100 terminates at a three-way valve 116 disposed outward of the frame 68, the operation of the three-way valve being described below. A lead (not shown) connects three-way valve 116 to a junction box 118 mounted to the left side of frame 68 at a position between tank support 70 and cross member 76 (refer additionally to FIG. 1). Junction box 118 is in turn connected to control panel 20 through a lead 120.

A principal drain line 122 horizontally disposed below the bottom surface 30 of filter tank 14 has an open end terminating at three-way valve 116 (see FIGS. 2 and 3). The opposite open end of principal drain line 122 has a ninety degree elbow formed therein to thereby extend vertically upward to connect with the drain aperture 98 formed in the bottom surface of sump 86. At this ninety degree elbow, a secondary drain line 124 of smaller diameter is coupled to principal drain line 122. Secondary drain line 124 extends vertically downward a short distance from its point of attachment, turns approximately ninety degrees, and then extends to a position slightly outward of frame 68 to terminate in a manually controlled spigot 126. As will be described in greater detail below, the secondary drain line and spigot are utilized during manual cleaning of the filter tank 14.

Suction pump 18 is a variable-speed, reversible pump powered by a motor 128, which is connected to junction box 118 through a lead 130 (refer additionally to FIG. 1). The inlet side of suction pump 18 is coupled to three-way valve 116 through an inlet line 132. The discharge side of suction pump 18 is coupled to a return line 134 which transports cooking oil back to the supply source (e.g., fryer, etc.). Because the suction pump must draw cooking oil under vacuum from the filter tank 14 (which is open to atmosphere), and must discharge the cooking oil into return line 134 under positive pressure, suction pump 18 is preferably a positive displacement pump. As will be described below, the suction pump must be capable of running at variable speeds in order to practice the method of operation of the present invention. Consequently, a gearbox 136 is employed to control the speed of suction pump 18. Suction pump 18, gearbox 136, and motor 128 are secured to the upper surface of a platform 138, which is in turn secured to the upper surfaces of cross members 74 and 78 of frame 68.

A hollow cylindrical still well 140 is formed in the lower portion of the right end wall 36 of filter tank 14 at a location proximate front sidewall 32 (see FIGS. 2 and 3). Still well 140 has a short horizontal section secured to right end wall 36 around an aperture formed therein, a ninety degree elbow section, and a lengthy vertical section that extends upwardly to a height near the top of filter tank 14. As a result, the level of cooking oil within still well 140 matches the level of cooking oil within filter tank 14.

An emergency shutoff mechanism 142 is mounted within the vertical section of still well 140, the mechanism being designed to cease operation of the filtering system 10 when the cooking oil level within the filter tank rises above an upper predetermined level. While many conventional devices may function as the emergency shutoff mechanism 142, a standard float switch is both economically and operationally preferable. A lead 144 connects emergency shutoff mechanism 142 to junction box 118.

A hollow cylindrical still well 146 is formed in the lower portion of the right end wall 36 of filter tank 14 at a location proximate back sidewall 34. Still well 146 has a short horizontal section secured to right end wall 36 around an aperture formed therein, a ninety degree elbow section, and a lengthy vertical section that extends upwardly to a height near the top of filter tank 14. As a result, the level of cooking oil within still well 146 matches the level of cooking oil within filter tank 14.

A level control mechanism 148 is mounted within the vertical section of still well 146, the level control mechanism being connected directly to control panel 20 through a shielded lead 150. A dedicated and shielded lead to control panel 20 is preferable in order to keep static interference levels at a minimum. Level control mechanism 148 includes a capacitive fluid level probe and a pre-amplifier, the probe sensing the cooking oil level within still well 146 (and thereby within the filter tank) and the pre-amplifier boosting and transmitting the probe signal to control panel 20 through lead 150. The amplified probe signal is received by a controller (not shown) housed within control panel 20, the controller being interactively connected to supply pump 12 through an inverter (described below) to thereby control the pump's operating speed. Thus, level control mechanism 148 allows an essentially constant cooking oil level to be maintained within filter tank 14.

FIGS. 5, 6, 7, and 8 illustrate that the filter cassette 16 generally includes a housing 152 having a fixed handle 154, a sealing frame 156 coupled to the housing by three spaced hinges 158, and a handle 160 pivotally mounted to the sealing frame. Handle 160 includes a pair of spaced latches 162 sized to engage housing 152 to hold the filter cassette 16 in its closed operative position. A filter pad 164 is adapted to be contained within a recess formed in housing 152.

Filter pad 164 is substantially rectangular, having an entrance side 166 and an opposing exit side 168. The filter pad is preferably formed with a larger mean pore size at the entrance side 166 than at the exit side 168. This pore size gradient allows larger contaminants to be removed upon their initial contact with the filter pad, whereas smaller contaminants are removed at locations deeper within the filter pad. Optionally, the entrance side 166 may be formed with a bumpy, rather than a relatively flat, surface to thereby increase the total surface area available for removal of the larger contaminants.

A seating cut-out 170 is formed in filter pad 164 by cropping one of its corners. Alternatively, such cropping may be eliminated if the filter pad is initially constructed to have the same peripheral configuration. As detailed below, it is the seating cut-out 170 that ensures filter pad 164 is properly oriented within filter cassette 16. Filter pad 164 should also have a thickness and compressibility necessary to form the required fluid-tight seal when the filter cassette 16 is in its closed operative position (shown in FIG. 6 and described below).

One such filter pad possessing these physical characteristics and the desired filtering properties is a filter pad (Product No. IF-17) commercially sold by Filtercorp, Inc. of Woodinville, Wash. This filter pad is composed of a cellulose fiber matrix having active filtering ingredients (e.g., activated carbon, etc.) bound within the matrix. As stated above, the filter pad has a mean pore size gradient across its depth dimension. Use of this particular filter pad in the filtering system 10 of the present invention allows effective filtering of contaminants down to a level of 0.5 microns.

Sealing frame 156 is a thin, substantially rectangular plate having a large, centrally located inlet opening 172 through which the contaminated cooking oil enters. An inner rib 174 and a spaced-apart outer rib 176 are integral with, and extend about the entire periphery of, the inside surface of sealing frame 156 (see FIG. 6). Inner rib 174 projects orthogonally outward from the inner surface of sealing frame 156 and terminates in a flat inner filter pad contact edge 178. Similarly, outer rib 176 projects orthogonally outward from the inner surface of sealing frame 156 and terminates in a flat outer filter pad contact edge 180. The ribs 174 and 176 have a peripheral configuration and dimension substantially matching, but slightly less than, that of filter pad 164. Accordingly, ribs 174 and 176 have one notched corner corresponding to the seating cut-out 170 of the filter pad. Thus, when filter cassette 16 is in its closed operative position, and filter pad 164 is in place, the contact edges 178 and 180 of ribs 174 and 176, respectively, form two peripheral lines of seal which ensure that the contaminated cooking oil passes through, rather than around, the filter pad.

Four spaced filter pad support rods 182 extend from the side of sealing frame 156 to which handle 160 is pivotally mounted to the opposite side of the sealing frame (i.e., across the shorter dimension of inlet opening 172).

Figure 6:
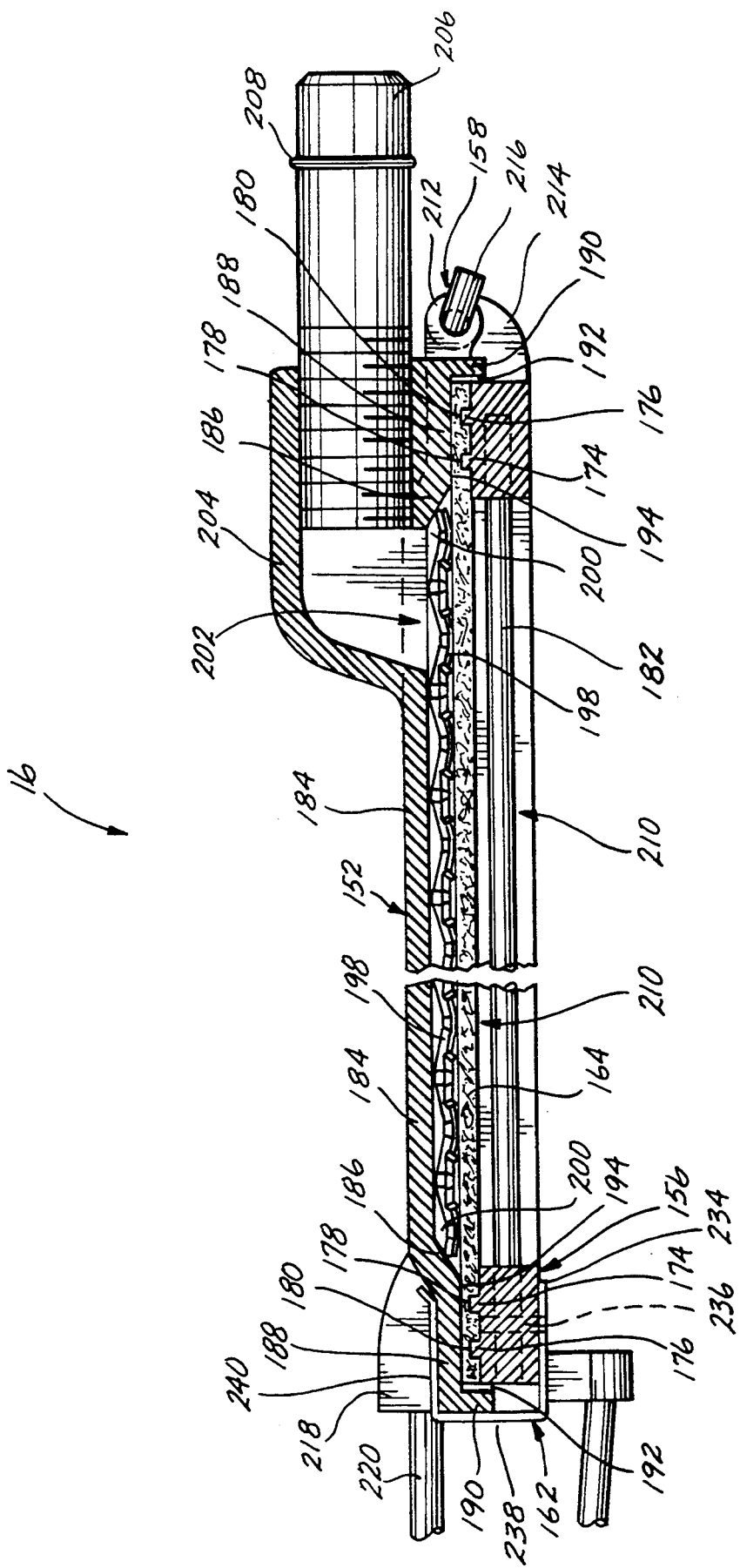
FIG. 6 is a partial cross-sectional view of the filter cassette shown in FIG. 5, with filter pad in place.
Figure 7:
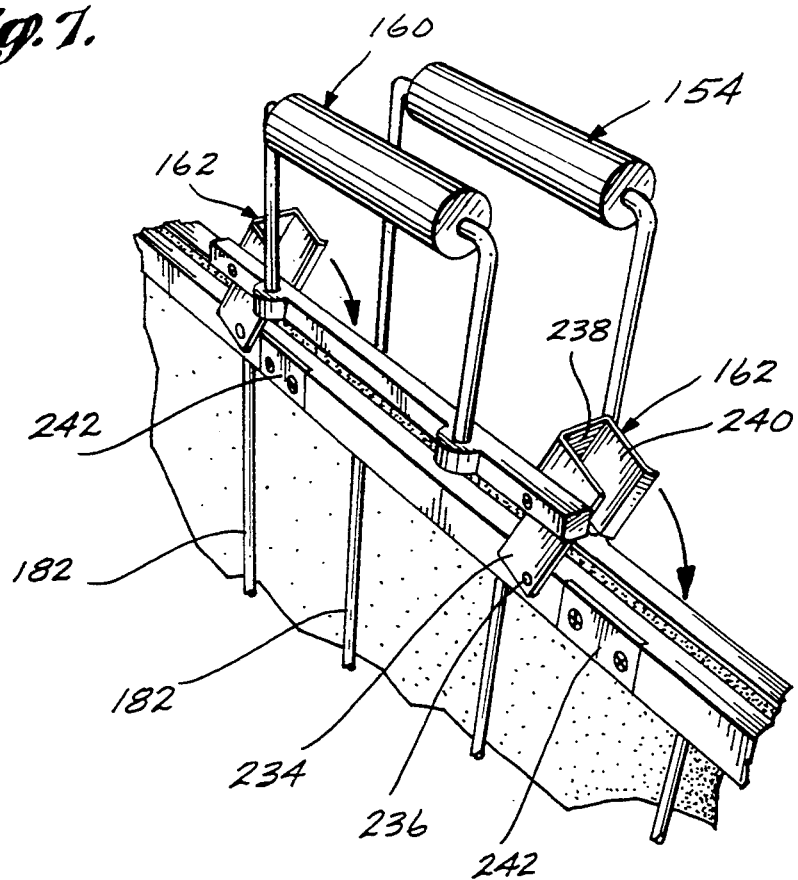
FIGS. 7 and 8 are perspective detail views showing the handling and latching features of the filter cassette shown in FIG. 5.

When oriented as shown in FIG. 6, housing 152 has a flat, centrally located, horizontally oriented upper surface 184; a peripheral, downwardly sloping angled edge 186 contiguous with upper surface 184; a peripheral, horizontally oriented lower surface 188 contiguous with angled edge 186; and a peripheral, downwardly projecting outer edge 190 contiguous with lower surface 188. Of course, FIG. 2 clearly illustrates that filter cassette 16 is actually oriented some ninety degrees from the orientation shown in FIG. 6 when the filter cassette is placed in its operational position within filter tank 14. The inner peripheral dimension of the outer edge 190 of housing 152 only slightly exceeds the outer peripheral dimension of sealing frame 156, so that a relatively snug fit exists between the housing and sealing frame when the filter cassette 16 is in its closed operative position. However, the fit is not so snug as to interfere with the operation of the hinges 158.

As shown in FIG. 6, the lower surface 188 and outer edge 190 of housing 152 define a recess 192 sized to receive the filter pad 164. The bottom of lower surface 188 provides a seating surface 194 against which the periphery of the filter pad is positioned. Lower surface 188, and therefore seating surface 194, have a peripheral configuration and dimension substantially matching, but slightly greater than, that of filter pad 164. Accordingly, seating surface 194 has one notched corner corresponding to the seating cut-out 170 of the filter pad. This notched corner configuration is defined by a solid corner 196 which extends downwardly from lower surface 188 of housing 152 the same distance as does outer edge 190 (see FIG. 5). It is this configuration of seating surface 194 and solid corner 196 that provides proper filter pad orientation by ensuring that only exit side 168 of filter pad 164 may rest against the seating surface. In short, the filter pad fits only one way. When the filter cassette 16 is in its closed operative position, the filter pad 164 is gripped between the seating surface 194 and the inner and outer ribs 174 and 176 of sealing frame 156 to provide a substantially fluid-tight seal.

Figure 5:
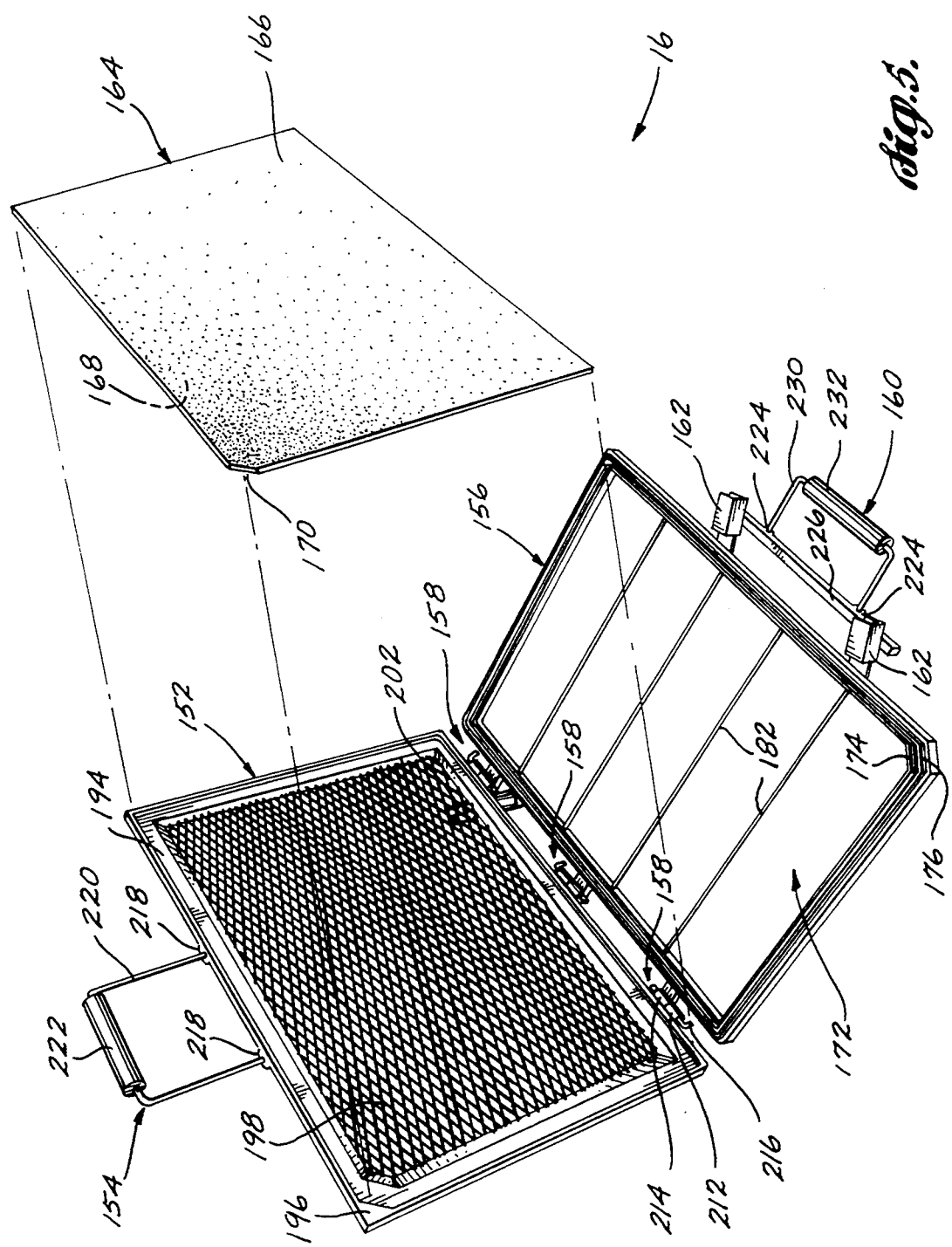
FIG. 5 is a perspective view of the filter cassette shown in FIG. 2 in its open position, with an associated filter pad exploded from its position of application.

A filter pad support screen 198 is mounted within a recess 200 defined by the upper surface 184 and angled edge 186 of housing 152 (see FIGS. 5 and 6). Preferably, the filter pad support screen is welded into place. Filter pad support screen 198 is an expanded metal matrix, with each matrix member having a substantially parallelogram-shaped cross section. Thus, filter pad support screen 198 provides a support surface for filter pad 164 in the central region of housing 152, while at the same time contacting only a miniscule portion of the surface area on the exit side 168 of the filter pad. Given this minimal area of contact, virtually no impedance is provided to the free flow of contaminated oil through the filter pad.

An outlet aperture 202, through which the filtered cooking oil exits, is formed in the upper surface 184 of housing 152 (see FIG. 6). Viewing housing 152 in the open position illustrated in FIG. 5, outlet aperture 202 is formed in upper surface 184 at a position adjacent and slightly inward of the right outer hinge 158. A raised shroud 204 integral with upper surface 184 surrounds the outlet aperture. A threaded bore is formed in the outward portion of raised shroud 204, the threaded bore being sized to receive the threaded end of a hollow cylindrical male coupling 206. Near the end of male coupling 206 distal from its end of threaded attachment, a circular recess sized to receive a resilient O-ring 208 is formed. As shown in FIG. 4, the male coupling 206, with resilient O-ring 208 in place, is received within the upper terminal end of riser 102 in slip coupling fashion to provide a sealed connection between filter cassette 16 and the riser. In this way, the vacuum applied by suction pump 18 draws contaminated cooking oil through the filter pad 164 and delivers filtered cooking oil into manifold 100 through riser 102 (when control valve 108 is in its open position).

Three spaced-apart hinges 158 hingedly couple the sealing frame 156 to the housing 152, such that a chamber 210 is formed when the sealing frame and housing are pivoted to the closed operative position (shown in FIG. 6). Chamber 210 is perhaps best viewed as the combination of the space formed by the recesses 192 and 200 of housing 152 and the space corresponding to inlet opening 172 of sealing frame 156. Each hinge 158 has a gudgeon 212 integral with housing 152 and disposed outwardly of outer edge 190. For the two outer hinges, a gudgeon 214 integral with sealing frame 156 is configured to be disposed immediately adjacent, inside of, and axially aligned with gudgeon 212. For the center hinge, a center gudgeon 214 integral with sealing frame 156 is disposed immediately adjacent and axially aligned with center gudgeon 212, but may be disposed on either side of the center gudgeon. Gudgeons 212 and 214 have central bores that are axially aligned and sized to receive a pin 216 which permits rotation of the gudgeons around the pin, thereby providing a hinged coupling of sealing frame 156 and housing 152. Pin 216 is easily removable from the central bores to provide easy and effective cleaning of the filter cassette components.

Handle 154 extends orthogonally outward from two mounting protuberances 218 integral with the lower surface 188 of housing 152, the mounting protuberances being positioned so that the handle is disposed at the approximate midpoint of the side of housing 152 opposite hinges 158. Handle 154 includes a U-shaped rod 220, which has a cylindrical handgrip 222 mounted to its middle section (i.e., the section distal from housing 152).

Handle 160 extends orthogonally outward from two centrally disposed mounting protuberances 224 integral with a handle support bar 226. Handle support bar 226 is pivotally attached to the two spaced latches 162, which are in turn pivotally attached to the surface of sealing frame 156 opposite that bearing ribs 174 and 176. Handle 160 includes a U-shaped rod 230 and a cylindrical handgrip 232 similar to these same components in handle 154, except that U-shaped rod 230 extends a shorter distance from mounting protuberances 224 than is the case with handle 154.

Each latch 162 includes a flat mounting portion 234 pivotally mounted to sealing frame 156 by a rivet 236; a flat, orthogonally extending bridging portion 238 contiguous with mounting portion 234; and a predominantly flat sealing portion 240 extending orthogonally from and contiguous with bridging portion 238 (see FIG. 6). Thus, mounting portion 234 and sealing portion 240 are in spaced parallel orientation, the space between being defined by the widthwise dimension of bridging portion 238. As shown in FIG. 6, this widthwise dimension of bridging portion 238 is such that contact edges 178 and 180 of sealing frame 156 compress the filter pad 164 to create a substantially fluid-tight seal at the junction of sealing frame 156 and housing 152 when the filter cassette 16 is held in a closed operative position by latches 162.

While the filter cassette 16 need not be limited to a single material of composition, its major components (including housing 152 and sealing frame 156) are preferably formed of aluminum to facilitate the manufacturing process. However, because latches 162 are formed of stainless steel, two stainless steel latch plates 242 are mounted to sealing frame 156 at locations designed to engage the mounting portion 234 of latches 162 when handle 160 is moved to its closed position (see FIGS. 7 and 8). Thus, undesirable engagement between stainless steel and aluminum is avoided. While not so illustrated, stainless steel latch plates may also be mounted to housing 152 at locations designed to engage the sealing portion 240 of latches 162.

Figure 8:
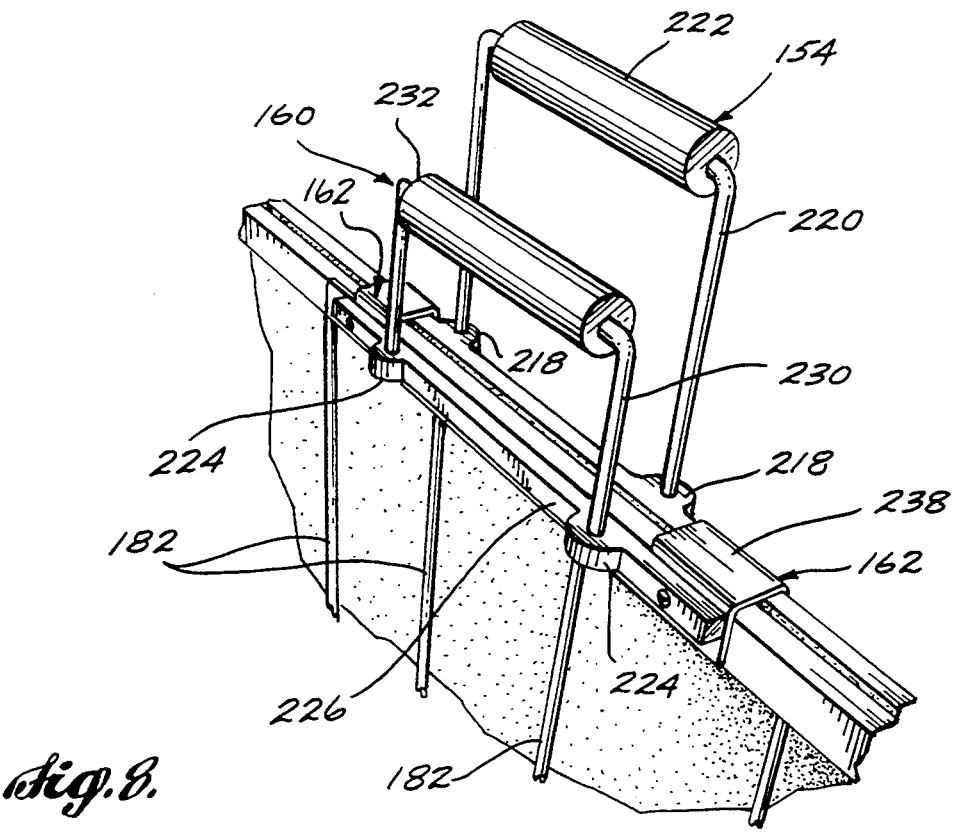

Referring to FIG. 8, it will be appreciated that when handle 160 is moved to its closed position, the U-shaped rod 220 of handle 154 and the U-shaped rod 230 of handle 160 are aligned. However, handgrip 222 is disposed significantly farther away from the closed and secured housing and sealing frame than is handgrip 232. This staggered handle design allows the filter cassette 16 to be inserted into, and removed from, filter tank 14 by handle 154 alone. This capability eliminates inadvertent opening of the filter cassette because handles 154 and 160 cannot be grasped in tandem. Were they not of staggered design, the force exerted by grasping the handles would naturally apply a force that may loosen, if not disengage, latches 162.

Referring to FIG. 1, it is illustrated that control panel 20 is mounted to an environmental structure (e.g., wall, etc.) at a location near filter tank 14. Control panel 20 has disposed within it an inverter 244 controlling the speed of supply pump 12 and an inverter 246 controlling the speed of suction pump 18, the speed of each pump thereby determining the rate of cooking oil flowing through the pump. Inverter 244 is controlled by level control mechanism 148, whereas inverter 246 has four pre-programmed settings corresponding to the most common flow rates utilized in the environment of application.

While not shown, control panel 20 also houses a programmable process logic controller (PLC) which is interactively coupled to inverters 244 and 246, three-way valve 116, and control switches (described below) disposed on the front door of control panel 20. As described below, the PLC may activate or deactivate the inverters, and orient the three-way valve, either according to its own internal programming or upon actuation of the control switches. An analog device, disposed within control panel 20 but also not shown, is interactively coupled to the PLC and receives direct input from inverter 244 as to the speed (and therefore flow rate) of supply pump 12.

Emergency shutoff mechanism 142 is coupled to a power control relay (not shown) through lead 144, junction box 118, and lead 120. When the level of cooking oil within filter tank 14 rises above an upper predetermined level, emergency shutoff mechanism 142, acting through the power control relay, cuts all control power in the control panel 20, thereby causing the inverters 244 and 246 to stop supply pump 12 and suction pump 18, respectively.

Control panel 20 has a front door 248 upon which are mounted eight control switches 250, collectively, and a digital display 252. An emergency throw switch 254 is mounted on the front face of control panel 20 adjacent front door 248, the emergency throw switch being capable of cutting all line power to control panel 20 and, correspondingly, to the entire filtering system 10.

Figure 9:
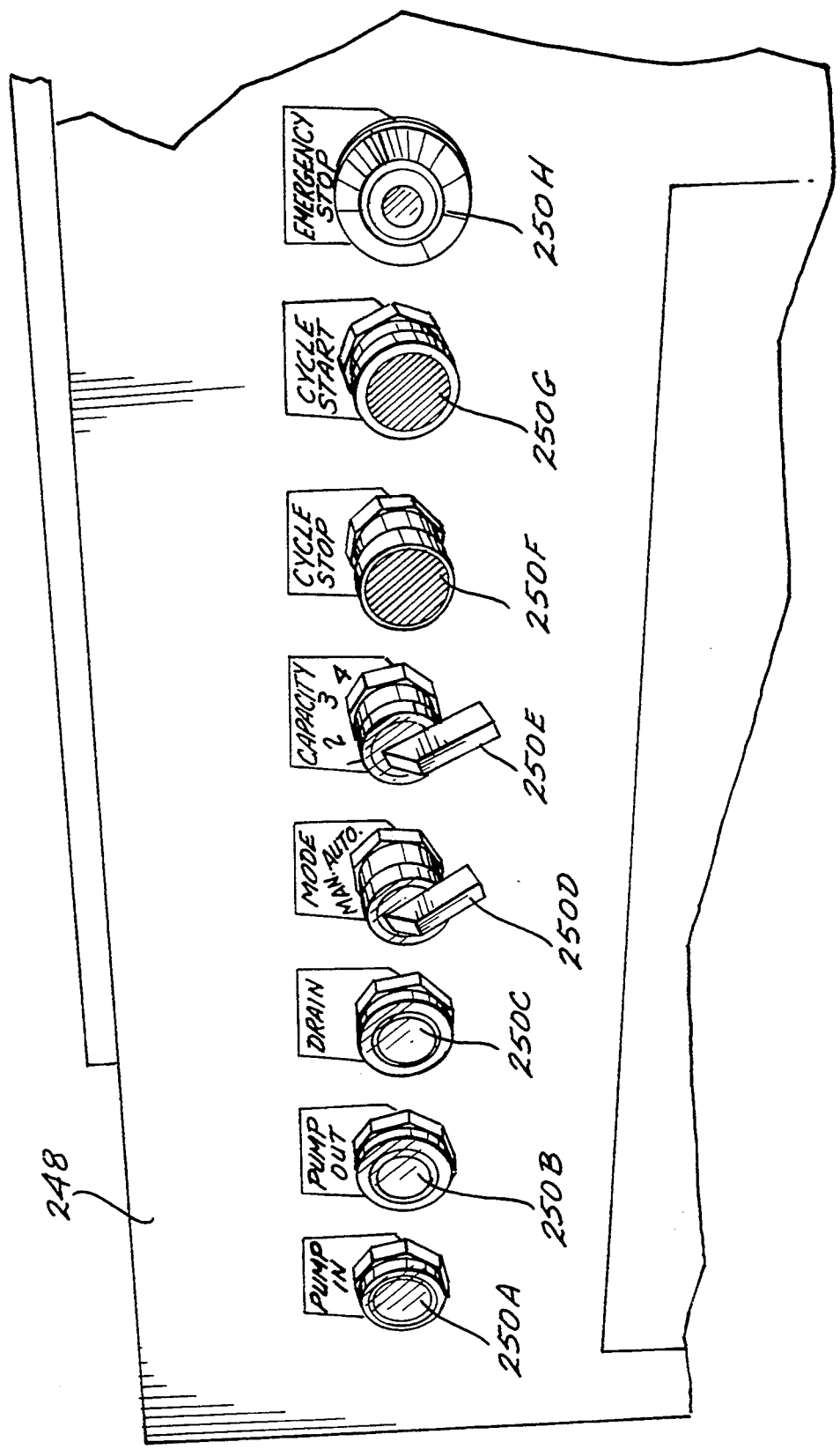
FIG. 9 is a detail view of control switches disposed on the front face of the control panel of the filtering system shown in FIG. 1.

Details of the eight control switches 250 are best comprehended by reference to FIG. 9. Control switch 250A, labeled "Pump In," is a pushbutton switch which is operable only when the filtering system 10 is in its manual mode of operation (see description of control switch 250D below). While being depressed, control switch 250A causes supply pump 12 to introduce contaminated cooking oil into filter tank 14.

Control switch 250B, labeled "Pump Out," is a pushbutton switch which also is operable only in the manual mode of operation. While being depressed, control switch 250B causes suction pump 18 to draw cooking oil from filter tank 14 and to discharge the oil through return line 134.

Control switch 250C, labeled "Drain," is a pushbutton switch operable only in the manual mode of operation. While being depressed, control switch 250C causes three-way valve 116 to reorient to allow suction pump 18 to draw cooking oil from filter tank 14 through principal drain line 122, rather than through manifold 100, and to discharge the oil through return line 134. As will be described below, use of control switches 250A, 250B, and 250C in the filtering system's manual mode of operation occurs principally during cleanup operations.

Control switch 250D, labeled "Mode," is a selector switch which may be moved between a manual mode of operation position and an automatic mode of operation position.

Control switch 250E, labeled "Capacity," is a selector switch which may be moved between four positions bearing the demarcations "1," "2," "3," and "4," respectively. These demarcations correspond to preset settings for inverter 246, and therefore to common desired speeds (and flow rams) for suction pump 18. Control switch 250E may be required, for example, where the filtering system 10 services between one and four supply sources.

Control switch 250F, labeled "Cycle Stop," is a pushbutton switch which, when actuated during the filtering system's automatic mode of operation, causes all filtering system components to cease operation.

Control switch 250G, labeled "Cycle Start," is a pushbutton switch which is actuated to key the PLC and thereby initiate the filtering system's automatic mode of operation. It should be noted that, as with control switch 250F, actuation of control switch 250G is effective only when control switch 250D is set in its automatic mode of operation position. To assist visual identification, control switch 250F preferably is colored red and control switch 250G preferably is colored green.

Control switch 250H, labeled "Emergency Stop," is a pushbutton switch which, when actuated, causes power to be cut to the control panel 20. This cut in power causes the inverters, and therefore the pumps, to cease operation. Of course, it will be appreciated that the ordering, and even the function, of these above-described control switches 250 may vary as a matter of design choice.

Figure 10:
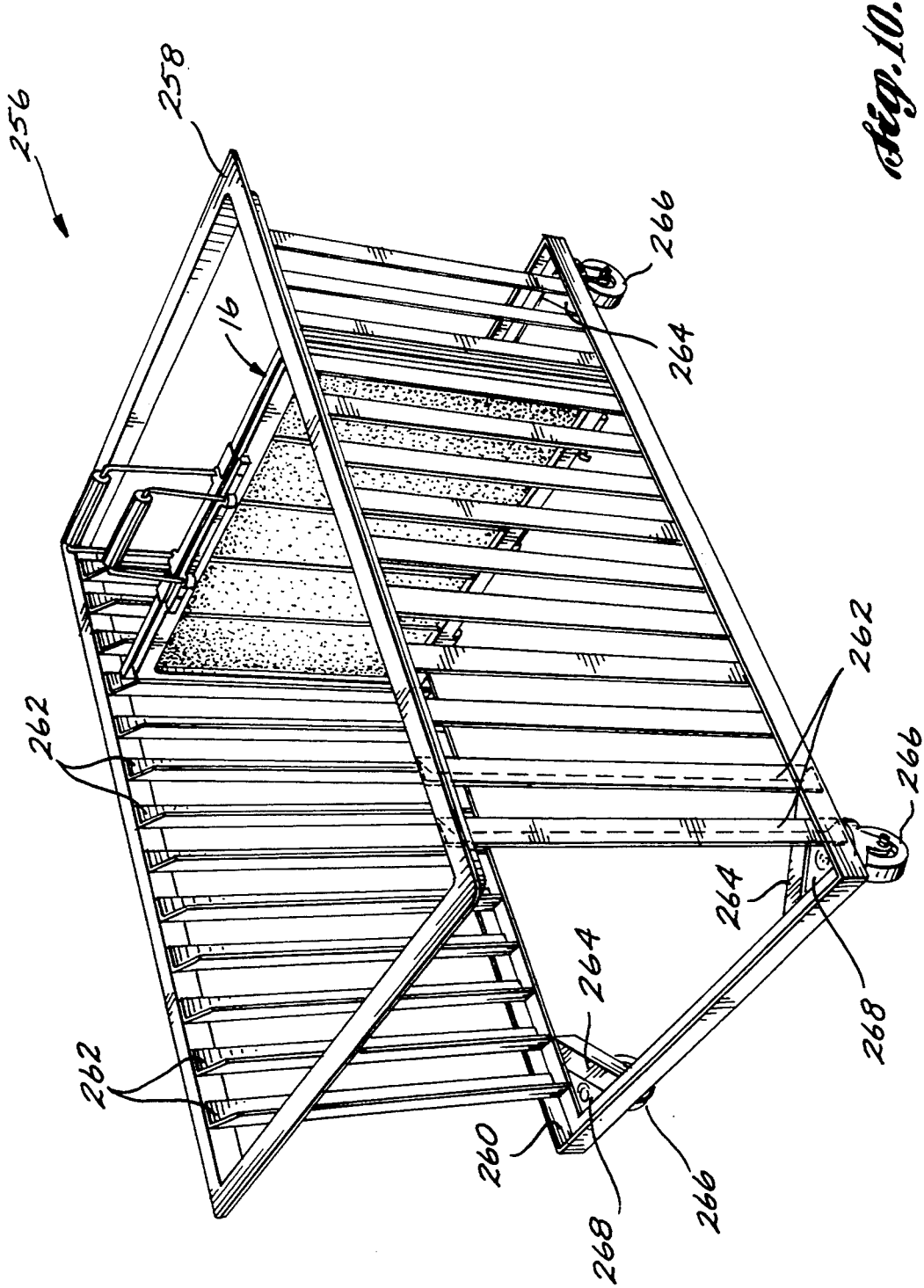
FIG. 10 is a perspective view of a filter cassette support cart, with filter cassette in place, used in conjunction with the filtering system shown in FIG. 1.

The filtering system 10 of the present invention also may include a filter cassette cart 256 (see FIG. 10). The filter cassette cart includes a horizontally oriented rectangular upper frame 258 of double-flange design, one flange extending vertically downward and the other flange extending horizontally outward from the junction of the two flanges. The filter cassette cart also includes a horizontally oriented rectangular lower frame 260 of double-flange design, one flange extending vertically upward and the other flange extending horizontally inward from the junction of the two flanges. The perimeters of upper frame 258 and lower frame 260 are sized so that the downwardly extending flange of the upper frame and the upwardly extending flange of the lower frame are coplanar.

Thirteen vertically oriented supports 262 of double-flange design are mounted to, and extend between, upper frame 258 and lower frame 260 at opposing spaced locations along the frame sides of greater dimension. The mounting flange of each support 262 is mounted by conventional methods to the vertically oriented flanges of the upper and lower frames, while the supporting flange of each support 262 extends orthogonally inward from the junction of the mounting and supporting flanges of the support. All supports 262 mounted to one side of filter cassette cart 256 have their mounting flanges oriented in the same direction, while the supports on the opposite side of the cart have their mounting flanges oriented in the opposite direction. This design provides a rectangular channel, defined by the supporting flanges of opposing supports 262, that is sized to receive a filter cassette 16. Thus, when a filter cassette 16 is inserted, its weight is borne by the horizontally oriented flange of lower frame 260. The filter cassette also is supported on each side by the inwardly projecting supporting flange of a support 262 to reduce side-to-side movement of the inserted cassette. While a filter cassette cart capable of holding thirteen filter cassettes has been illustrated, it will be appreciated that providing a cart capable of holding a greater or smaller number of cassettes requires only minor design changes.

Four diagonal braces 264 are mounted in each corner of lower frame 260 to maintain the structural integrity of the lower frame. A roller 266, pivotally attached to lower frame 260 and to brace 264 through a mounting plate 268, is disposed in each corner to provide for easy movement of the filter cassette cart.

Operation

The startup procedure begins with loading fresh filter cassettes 16 (i.e., cassettes having new filter pads) into a clean filter tank 14. Mode control switch 250D is set to its automatic mode of operation position and then Cycle Start control switch 250G is pushed to activate the PLC. The PLC, through its program, activates inverter 244 controlling supply pump 12 to fill the filter tank with contaminated cooking oil. The PLC also initiates a built-in timer circuit controlling inverter 246, which in turn controls suction pump 18. When the preprogrammed time has been reached, three-way valve 116 is properly oriented and suction pump 18 begins to draw contaminated cooking oil under vacuum from the interior of filter tank 14 through filter cassettes 16. The filtered cooking oil then passes into the inlet side of the suction pump via manifold 100, and exits the discharge side of the suction pump under positive pressure to be returned to the supply source via return line 134.

Simultaneous with the initiation of the suction pump timer circuit, the PLC also initiates a built-in relaxation cycle timer circuit and a built-in backflush cycle timer circuit. The relaxation and backflush cycles are described below.

Once filter tank 14 has been filled, and both supply pump 12 and suction pump 18 are running, "normal automatic operation" has begun. The speed, and resultant flow rate, of the pumps corresponds to one of the four preset settings for inverter 246, the speed being selected using Capacity control switch 250E. During normal automatic operation, the desired level of cooking oil 270 within the filter tank is at or near the top of the filter cassette 16, said top being defined by the uppermost portions of sealing frame 156 and housing 152 of the filter cassette (see FIG. 4). The level should never be so low as to expose the filter pad 164 to atmosphere, otherwise suction is broken. As described above, level control mechanism 148 monitors the level of cooking oil within filter tank 14 and transmits this monitored reading to a controller housed within control panel 20. The controller, acting through inverter 244, modulates the speed of supply pump 12 to maintain the desired level of cooking oil within the filter tank.

As normal automatic operation proceeds, contaminants begin to accumulate, or plate out, on the entrance side 166 of filter pad 164. As the accumulation increases, the number of surface sites available for filtering is diminished and resistance to flow through the filter pad is increased, thereby decreasing the degree of effective filtering that may be accomplished by the filtering system. Accordingly, the automatic mode of operation of the filtering system 10 includes a backflush cycle designed to dislodge the contaminant cake that has built up on the entrance side of the filter pad.

As stated above, a timer circuit within the PLC periodically initiates the backflush cycle. At the pre-programmed time, the PLC shuts off both the supply pump 12 and the suction pump 18. There is a pause of sufficient time to allow both pumps to spin down to zero cycles (or revolutions) per second. Suction pump 18 is then started up in reverse for one or more short pulses of reverse flow. As the oil flows upwardly from the manifold 100 through risers 102, then into each filter cassette 16 through male coupling 206, and lastly out through the entrance side 166 of filter pad 164, the cake of built-up contaminants is dislodged from this surface of the filter pad. Filter pad support rods 182 ensure that the filter pad 164 is not blown out through the inlet opening 172 of sealing frame 156 during the periods of reverse flow.

The frequency of administration and the number of reverse pulses is program variable, as is the period of time between pulses. While each of these parameters may vary as a function of the fluid being filtered, it has been found that the administration of one to five reverse pulses, with up to five seconds between each pulse, every two hours, has been found advantageous in most cooking oil filtering applications.

After the reverse pulses have been administered, the PLC then reorients three-way valve 116 and starts suction pump 18 in the forward direction to allow the suction pump to draw oil from the bottom of the filter tank 14 through drain aperture 98, then into the inlet side of the suction pump via principal drain line 122 and inlet line 132, and finally out the discharge side of the suction pump into return line 134. This direction of flow is provided by the filtering system 10 for a short period of time to assist the dislodged particles in migrating to the bottom of the filter tank, so that they do not replate to the inlet face of the filter pad when normal forward flow recommences. As the oil is drawn from the bottom of the filter tank through drain aperture 98, the dislodged particles then plate out on wire cloth 90 of sump screen 88.

The desired duration of flow through the bottom of the filter tank may vary with the fluid being filtered. However, it has been found that thirty to sixty seconds of such flow is sufficient in most cooking oil filtering applications. Because this period of flow through the bottom of the filter tank is controlled by the PLC, it is also program variable. At the conclusion of this bottom flow period, three-way valve 116 is again reoriented to allow the cooking oil to exit the filter tank through the filter cassettes 16 and risers 102 (i.e., normal forward flow in the normal automatic operating mode).

Figure 11A:
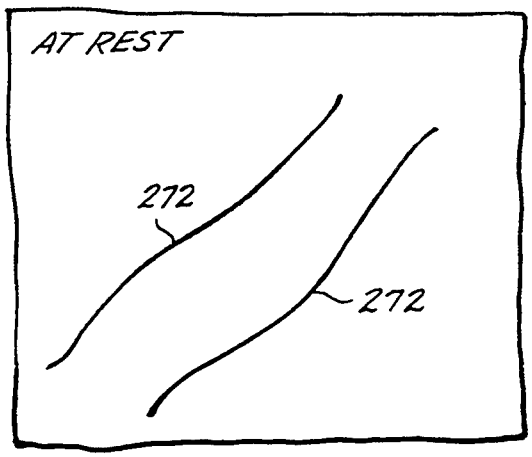
FIGS. 11A and 11B are schematic views showing the interstitial area between adjacent fibers of the filter pad when at rest and when a vacuum is applied, respectively.
Figure 11B:
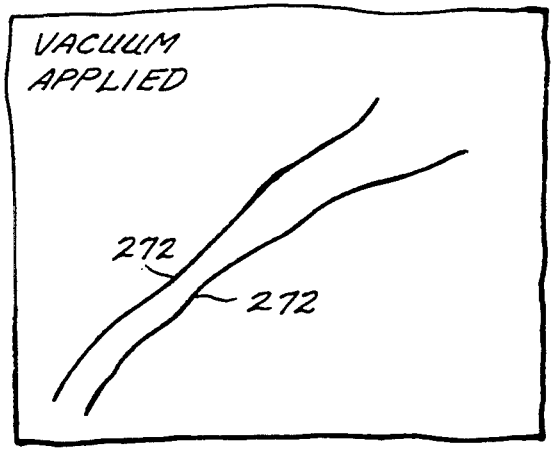
Figure 12A:
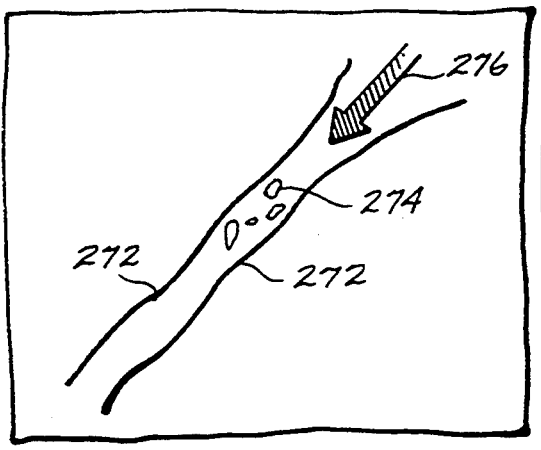
FIGS. 12A, 12B, and 12C are schematic views showing the accumulation of contaminants within, and the resultant reduction in fluid flow through, the interstitial area shown in FIG. 11B.
Figure 12B:
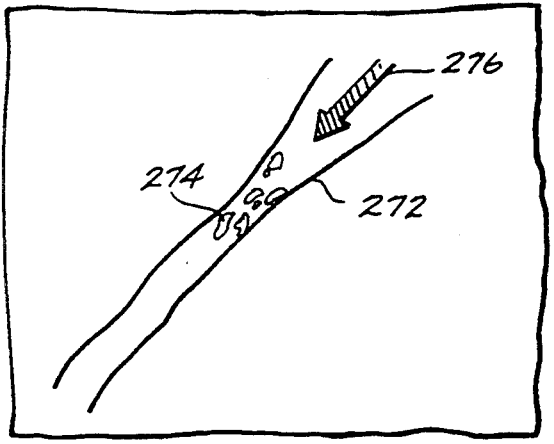
Figure 12C:
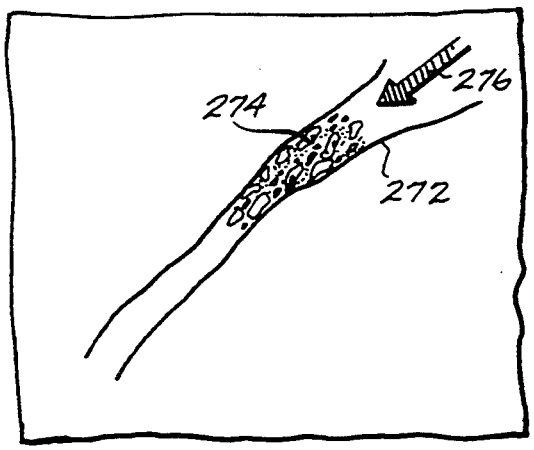

Because the filter pad 164 is formed of a cellulose fiber matrix having a substantial thickness dimension and a mean pore size gradient, contaminants accumulate along the entire depth of the filter pad. Generally, larger contaminants are removed nearer the entrance side of the filter pad, whereas smaller contaminants are removed nearer the exit side of the filter pad. As the deforming vacuum force is applied to filter pad 164, the interstitial space between adjacent fibers 272 of the matrix is decreased (see FIGS. 11A and 11B). Referring to FIGS. 12A, 12B, and 12C, it is illustrated that, as the number of accumulated contaminants 274 increases, the flow of oil 276 through the interstitial space between the fibers 272 is diminished. Accordingly, the automatic mode of operation of the filtering system 10 includes a relaxation cycle designed to remove these pocket accumulations of contaminants. The net result is that the filter pad is rejuvenated with each relaxation cycle, and the pad's internal loading capacity is thereby increased.

Figure 13A:
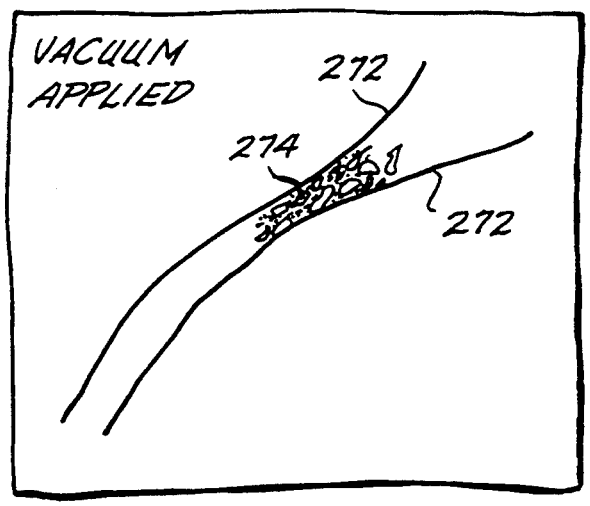
FIGS. 13A, 13B, and 13C are schematic views showing the dislodging of accumulated contaminants accomplished during the relaxation cycle associated with operation of the filtering system of the present invention.
Figure 13B:
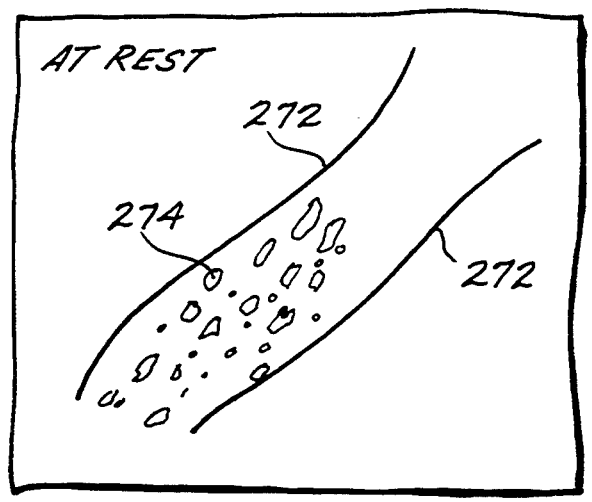
Figure 13C:
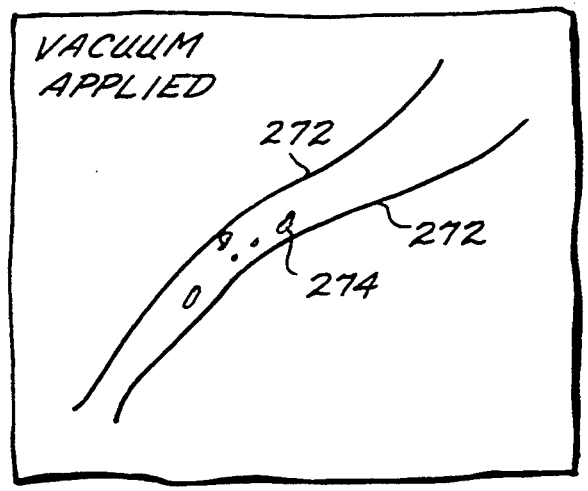

As described above, a timer circuit within the PLC initiates the relaxation cycle. At the pre-programmed time, the PLC causes the vacuum applied by suction pump 18 to be interrupted for a pause period and then reapplied for a resumption period. This pause period of no flow followed by a resumption period of normal forward flow may be repeated until sufficient internal dislodging of contaminant pockets has occurred within the filter pad. This dislodging of contaminants is best understood by reference to FIGS. 13A, 13B, and 13C.

The frequency of administration, the number of iterations, the duration of the pause period, and the duration of the resumption period are program variable. While these parameters may vary with each filtering application, it has been found that the administration of three iterations of a ten second pause period followed by a ten second resumption period every fifteen minutes is advantageous in most cooking oil filtering applications. After the desired relaxation cycle iterations have been performed, the PLC then returns the filtering system 10 to normal automatic operation.

While the backflush and relaxation cycles significantly increase the useful life of the filter pad 164, at some point the filter pad will nevertheless reach a state beyond which it is not advisable to continue filtering operations. When the filter pad reaches this state of contaminant buildup, the filter pad should be replaced. While the contaminant loading of the filter pad will vary with each area of application, a period of eight to twelve hours between filter pad replacements is reasonable in most cooking oil filtering applications.

Replacement of one or more filter pads 164 may be performed while the filtering system 10 continues to operate, thereby resulting in no process down time. Control valve 108 for the associated filter cassette 16 housing the pad is closed and the filter cassette removed from the filter tank 14. The contaminated filter pad is removed, the filter cassette cleaned, and a fresh filter pad installed. The cassette housing the fresh filter pad may then be reinserted into the filter tank and the control valve returned to its open (filtering) position.

Replacement of filter pads 164 also may be performed wherein the operation of filtering system 10 is ceased. To replace the filter pads under this scenario, the filtering system operator will either depress Cycle Stop control switch 250F or turn the selector of Mode control switch 250D to its manual mode of operation position. Either action shuts down the automatic mode of operation for the filtering system 10, thereby leaving a filter tank 14 full of oil. Drain control switch 250C and Pump Out control switch 250B are then simultaneously depressed. While depressed, control switch 250B causes suction pump 18 to draw cooking oil from the filter tank, and control switch 250C reorients three-way valve 116 so that the cooking oil is drawn from the filter tank through drain aperture 98 and fed to the inlet side of suction pump 18 through principal drain line 122 and inlet line 132. The simultaneous depression of control switches 250B and 250C is continued until all cooking oil is drained from the filter tank. It will be appreciated that, alternatively, control switch 250C may be designed to reorient the three-way valve with a single depression, rather than continuous depression.

Once this pump-down process is complete, the cleanup process is performed. Filter cassettes 16 are extracted from the filter tank, placed in filter cassette cart 256, and transported to a location where the contaminated filter pads may be removed, the filter cassettes cleaned, and fresh filter pads installed. Splash screen 48 and sump screen 88 may also be removed and transported to a location where they can be cleaned. Preferably, the filtering system 10 is located near a hose (with or without spray jet) carrying a supply of high-pressure water. If so, all surfaces within the filter tank may be sprayed down, and therefore cleaned, with the high-pressure water. The water introduced into the interior of filter tank 14, and the contaminants dislodged thereby, may be removed from the bottom of the filter tank through drain aperture 98 and then collected within a receptacle (e.g., bucket, etc.) after passing via gravity through secondary drain line 124 and out spigot 126. If a source of high-pressure water is present, it will be appreciated that splash screen 48 and sump screen 88 need not be transported for cleaning, but may be cleaned within the interior of the filter tank. While not normally utilized, Pump In control switch 250A may be actuated if it is desirable to add oil to the filter tank to facilitate the cleanup process.

As the above-described filter pad change-out point approaches, an oil shearing phenomena may develop. This phenomena is best understood through the use of an example. During the initial stages of normal automatic operation, with the filter cassettes 16 initially containing fresh filter pads 164, suppose that suction pump 18 operates at sixty cycles per second to draw one hundred gallons per minute through the filter cassettes. As described above, the level control mechanism 148 controls the volumetric flow rate of supply pump 12 so as to maintain an essentially constant level of cooking oil within filter tank 14. Ignoring minor deviations, this means that supply pump 12 also is operating at sixty cycles per second (assuming the pumps have the same rating) and one hundred gallons per minute during initial filtering operations.

Despite the backflush and relaxation cycles, the filter pads nevertheless become saturated with contaminants, and resistance to flow through the filter pad is greatly increased. Consequently, suction pump 18 might be able to draw only seventy gallons per minute while operating at sixty cycles per second during this loaded condition. The result is that the suction pump is operating at a frequency too high for the volumetric flow that is being drawn. This causes the cooking oil passing through suction pump 18 to be exposed to undesirable churning, or shearing, which leads to the breakdown of desirable macro molecules contained within the cooking oil. Loss of these macro molecules yields a cooking oil having inferior cooking qualities when returned to the supply source.

To combat this shearing phenomenon, the analog device housed within control panel 20 monitors the volumetric output of supply pump 12 and, when a sufficient drop in flow rate has occurred, the operating frequency of the suction pump is reduced in a manner described in the paragraph below. Using the example described above, when the flow rate of supply pump 12 has dropped to perhaps seventy-five gallons per minute, the operating frequency of suction pump 18 may be reduced from sixty cycles per second to perhaps forty-five cycles per second. Despite this drop in operating frequency, it is still possible for the suction pump to discharge nearly seventy-five gallons per minute. However, the more important aspect of this reduced operating frequency is that the shearing phenomenon is eliminated.

The analog device housed within control panel 20 continuously monitors inverter 244 and, therefore, the flow rate of supply pump 12. When the analog device senses that the flow rate of supply pump has fallen below a preset trigger point, a signal is sent to the PLC. A timer circuit within the PLC is initiated and, if the supply pump flow rate is still below the trigger point at the end of the timer circuit period (e.g., fifteen minutes), the PLC reduces the operating frequency of suction pump 18. The timer circuit ensures that the sensed low-flow condition is not simply an aberration. The trigger point is preferably set at sixty to eighty percent of the initial flow rate of supply pump 12 (i.e., the pump's flow rate when normal automatic filtering operation begins). More preferably, the trigger point is set at seventy to seventy-five percent of this value.

If the filtering system 10 of the present invention services more than one supply source (e.g., fryer, etc.), a supply manifold (not shown) may be utilized to draw an equal amount of cooking oil to be filtered from each of the supply sources. Consequently, a return manifold (not shown) must also be utilized to evenly distribute the filtered cooking oil to the multiple supply sources. To minimize the amount of piping required, the supply and return manifolds are preferably located adjacent the multiple supply sources. Additionally, an equalizer manifold (not shown) may be used in conjunction with either the supply manifold, the return manifold, or both to compensate for differences in line friction.

A prescreening, or crumb removal, station may be positioned either upstream of the supply pump 12, or between the supply pump and the filter tank 14. However, it is preferable that such a station be located upstream of the supply pump so as not to expose the supply pump to the larger contaminants (i.e., gross crumbs and sediments). Existing absolute filtering systems of the type described in the Background of the Invention section (e.g., paper, wire cloth, etc.) may be utilized to perform the crumb removal step. Removal of the larger contaminants in this manner will extend the loading life of the filter pad, particularly the external loading life of the pad, due to the reduction in the level of contaminant build-up at the inlet face of the pad.

Caveats

While a preferred embodiment of the present invention has been illustrated and described, it should be understood that variations could be made therein without departing from the scope of the invention. For instance, the filtering system of the present invention may be used in conjunction with filter pads of various composition to filter fluids other than contaminated cooking oil. As a further example, a second analog device may be employed as an alternative to the backflush cycle timer circuit built into the PLC. This would result in the backflush cycle being administered when monitored process parameters so indicate, rather than at discrete time intervals. Additionally, the two approaches taken to extend the loading life of the filter pad (backflush cycle and relaxation cycle) and the shear prevention measure all need not be employed. Beneficial filtering results would be obtained with any one individually, or with a combination of two.

Accordingly, it is to be understood that the invention is not to be limited to the specific embodiment illustrated and described. Rather, the true scope of the invention is to be determined by reference to the following claims.

The embodiments of the invention in which an exclusive property or privilege is claimed are defined as follows:

1. A method of filtering a contaminated fluid housed within a supply source, the method including the steps of:
    (a) withdrawing the contaminated fluid from the supply source;
    (b) introducing a first flow of the contaminated fluid into a filter tank;
    (c) drawing the contaminated fluid under vacuum through a plurality of filter pads disposed within the filter tank to yield a filtered fluid, said drawing step defining a forward direction of flow;
    (d) returning a second flow of filtered fluid from the filter tank to the supply source, said first flow being substantially matched to said second flow;
    (e) periodically reversing flow through the plurality of filter pads upon the occurrence of a first filtering process condition; and
    (f) periodically interrupting flow through the plurality of filter pads upon the occurrence of a second filtering process condition.

2. The method of claim 1, further comprising the step of reducing said second flow when said first flow falls below a preset percentage of its initial flow rate to thereby prevent shearing of the contaminated fluid.

3. The method of claim 2, wherein said preset percentage is between 60% and 80%.

4. The method of claim 3, wherein said preset percentage is between 70% and 75%.

5. The method of claim 1, wherein said interrupting step comprises at least 1 cycle of a period of no flow followed by a period of forward flow.

6. The method of claim 5, wherein said interrupting step comprises 3 of said cycles.

7. The method of claim 1, wherein said reversing step comprises between 1 and 5 pulses of reverse flow.

8. The method of claim 7, wherein up to 5 seconds of no flow exists between each of said pulses.

9. The method of claim 1, further comprising the step of prescreening the contaminated fluid prior to said introducing step to remove larger contaminants.

10. The method of claim 1, wherein said first filtering process condition corresponds to the passage of a first amount of time.

11. The method of claim 1, wherein said first filtering process condition corresponds to said first flow falling below a certain percentage of its initial flow rate.

12. The method of claim 1, wherein said second filtering process condition corresponds to the passage of a second amount of time.

13. The method of claim 1, wherein the contaminated fluid being filtered is cooking oil.

14. The method of claim 1, wherein each of the filter pads is housed within a separate filter cassette capable of being inserted into and extracted from the filter tank without termination of the filtering process.

15. A method of filtering a contaminated fluid housed within a supply source, the method including the steps of:
    (a) withdrawing the contaminated fluid from the supply source;
    (b) introducing a first flow of the contaminated fluid into a filter tank;
    (c) drawing the contaminated fluid under vacuum through a plurality of filter pads disposed within the filter tank to yield a filtered fluid, said drawing step defining a forward direction of flow;
    (d) returning a second flow of filtered fluid from the filter tank to the supply source, said first flow being substantially matched to said second flow; and
    (e) periodically reversing flow through the plurality of filter pads upon the occurrence of a first filtering process condition.

16. The method of claim 15, further comprising the step of reducing said second flow when said first flow falls below a preset percentage of its initial flow rate to thereby prevent shearing of the contaminated fluid.

17. A method of filtering a contaminated fluid housed within a supply source, the method including the steps of:
    (a) withdrawing the contaminated fluid from the supply source;
    (b) introducing a first flow of the contaminated fluid into a filter tank;
    (c) drawing the contaminated fluid under vacuum through a plurality of filter pads disposed within the filter tank to yield a filtered fluid, said drawing step defining a forward direction of flow;
    (d) returning a second flow of filtered fluid from the filter tank to the supply source, said first flow being substantially matched to said second flow; and
    (e) periodically interrupting flow through the plurality of filter pads upon the occurrence of a second filtering process condition.

18. The method of claim 17, further comprising the step of reducing said second flow when said first flow falls below a preset percentage of its initial flow rate to thereby prevent shearing of the contaminated fluid.

* * * * *

UNITED STATES PATENT AND TRADEMARK OFFICE
CERTIFICATE OF CORRECTION

PATENT NO. : 5,439,601
DATED : August 8, 1995
INVENTOR(S) : S.A. Burklund et al.

It is certified that error appears in the above-indentified patent and that said Letters Patent is hereby corrected as shown below:

| COLUMN | LINE | |
|---|---|---|
| 9 | 31 | "comers." should read --corners-- |
| 9 | 65 | "comer" should read --corner-- |
| 10 | 36 | "comer" should read --corner-- |
| 10 | 38 | "comer" should read --corner-- |
| 10 | 39 | "comer" should read --corner-- |
| 10 | 42 | "comer" should read --corner-- |
| 14 | 43 | "comer" should read --corner-- |
| 14 | 47 | "comer" should read --corner-- |
| 15 | 58 | "hours," should read --hours-- |

Signed and Sealed this

Twenty-eighth Day of November 1995

Attest:

BRUCE LEHMAN

Attesting Officer        Commissioner of Patents and Trademarks